United States Patent
Carobolante et al.

[19]

[11] Patent Number: 6,081,112
[45] Date of Patent: Jun. 27, 2000

[54] METHOD AND CIRCUIT FOR DETERMINING THE VELOCITY OF A DATA DETECTOR MECHANISM OF A MASS STORAGE DEVICE, OR THE LIKE, USING A BEMF VOLTAGE IN THE ASSOCIATED VOICE COIL

[75] Inventors: Francesco Carobolante, Scotts Valley; Paolo Menegoli, San Jose, both of Calif.

[73] Assignee: STMicroelectronics, Inc., Carrollton, Tex.

[21] Appl. No.: 09/135,471

[22] Filed: Aug. 17, 1998

[51] Int. Cl.[7] .............................. G01P 3/46; G11B 21/02; H02P 7/00
[52] U.S. Cl. .......................... 324/177; 360/75; 360/105
[58] Field of Search ................... 324/177, 210, 324/212; 360/69, 75, 73.03, 102, 103, 105, 78.06, 78.12, 78.09; 318/811

[56] References Cited

U.S. PATENT DOCUMENTS

| | | | |
|---|---|---|---|
| 5,221,881 | 6/1993 | Cameron | 318/254 |
| 5,285,135 | 2/1994 | Carobolante et al. | 318/254 |
| 5,297,024 | 3/1994 | Carobolante | 360/67 |
| 5,566,369 | 10/1996 | Carobolante | 360/75 |
| 5,615,064 | 3/1997 | Blank et al. | 360/75 |
| 5,838,515 | 11/1998 | Mortazavi et al. | 360/78.12 |
| 5,869,946 | 2/1999 | Carobolante | 318/811 |

OTHER PUBLICATIONS

Pedrazzini, "IBM Hard Disk Drive Load/Unload Technology," *Computer Data Storage Newsletter*, Jul. 1997, vol. 10(7), Issue No. 114, p. 12.

*Primary Examiner*—Jay Patidar
*Attorney, Agent, or Firm*—David V. Carlson; Theodore E. Galanthay; Lisa K. Jorgenson

[57] ABSTRACT

A circuit and method for measuring a back EMF voltage of a voice coil in a mass storage device, or the like, includes an amplifier connected across the coil to produce an output signal proportional to a voltage across the coil and a circuit connected to selectively connect the output signal of the amplifier to a circuit output when a driving current is not applied to said coil. A sample window is generated after drive currents within the coil have been allowed to decay to zero, and between a time during which a PWM signal changes from negative to positive and a time when the PWM waveform crosses a voltage error value.

15 Claims, 3 Drawing Sheets

METHOD AND CIRCUIT FOR DETERMINING THE VELOCITY OF A DATA DETECTOR MECHANISM OF A MASS STORAGE DEVICE, OR THE LIKE, USING A BEMF VOLTAGE IN THE ASSOCIATED VOICE COIL

BACKGROUND OF THE INVENTION

1. Field of the Invention

This invention relates to improvements in methods and circuits for determining the velocity of a data detector mechanism of a mass storage device, or the like, and more particularly to improvements in methods and circuits for generating a BEMF voltage which may be used in a feedback loop of a voice coil for determining the velocity of a data detector mechanism of a mass storage device, or the like.

2. Relevant Background

In mass storage devices, such as computer hard disk drives, CD-ROMs, DVDs, or the like, typically a recording and/or reading head or data detector is used that is positioned at selective locations radially outwardly from the center of a rotating data medium to read and/or write digital data onto the data medium. The head is positioned by selectively applying controlled voltages to a "voice coil" to move a mechanism that carries the head.

The head typically "flies" across the data medium, with air currents generated on account of the disk rotation causing the head to float above the surface of the medium. Under certain circumstances, the head is positioned to a "parked" position, typically with the head mechanism moved up a ramp or keeper assembly, so that when the disk rotation is stopped, the head is maintained at a position away from the recording medium. This is particularly important in "laptop" or portable computers that may be subjected to bumps or vibrations that might otherwise cause unwanted contact between the heads and the surface of the recording medium, which may damage either.

In moving the head to the ramped or parked position, it is important that sufficient voltage be applied to the voice coil to cause the head mechanism to be sufficiently moved to the parked position. At the same time, it is often important that an excessive voltage not be applied, since the parking is often performed during power down operations when power needs to be conserved for other power down functions and to insure that the heads are not overdriven into their parked position to avoid unnecessary damage. Consequently, it is desirable that a positioning voltage be applied to the voice coil in proportion to the instantaneous velocity of the head mechanism, so that just the correct energy is applied as may be necessary to move the head to the desired parked (or other) position.

Determining the instantaneous velocity of the head mechanism is difficult, however, since information is not instantaneously available from the driving voltages from which instantaneous velocity can be determined. It has been suggested that a back electromagnetic field (BEMF) voltage, which is proportional to the velocity, be used to develop the velocity information for use in a feedback system. This feedback is important to close the loop and ensure an accurate velocity control.

Typically the BEMF information is extracted by a circuit of the type shown in FIG. 1, described below, which performs the following operation:

$$V_{BEMF} = V_{coil} - I_{coil} \times Z_{coil}$$

Where:

$V_{coil}$ is the voltage across the motor coil $I_{coil}$ is the current through the motor coil $Z_{coil}$ is the impedance of the motor coil (typically the square root of the sum of the squares of resistance plus inductive reactance)

While usually the voltage and current through the coil can be measured quite accurately, the difficulty of extracting an accurate value for the BEMF is due to the difficulty in estimating the value of the impedance of the coil. The impedance is especially hard to estimate because of the changes it undergoes due to production spread and due to temperature variations.

In a continuous closed loop system, often the desired impedance estimate accuracy is obtained through periodic "recalibration" of the value, which usually requires both hardware and software to perform the action. This often is expensive as a system solution, because it required digital to analog convertors and/or auto-zero circuits.

Thus, with reference now to FIG. 1, a circuit 10 is shown that may be used as a part of a control circuit for controlling the movement of the head mechanism (not shown) associated with the voice coil 11. A sense resistor 14 is connected in series with the coil 11 to receive driving currents that are applied via an input amplifier 16. The voltages across the coil 11 and resistor 14 are connected to a velocity detector 18, which generates at its output a BEMF voltage on line 20, which is summed with the input voltage to the circuit on line 22 by a summer circuit 24. The output of the summer circuit 24 is applied to the input of the amplifier 16. The circuit 10, therefore, provides driving currents to the coil 11 to move the head mechanism at a velocity determined by the velocity detector 18.

FIG. 2 shows one circuit which has been used to provide a velocity detector in the circuit of FIG. 1 in controlling the velocity of the motor using a BEMF voltage. The circuit 10 has a coil 11, which is illustrated having two parts, a pure inductive reactance part 12 and a resistance part 13. A current, $I_{coil}$, is applied to the coil 11, to pass therethrough and through a sense resistor 14. The BEMF voltage on line 20 is developed by a first amplifier 22 that is connected across the coil 11, and a second amplifier 26, which is connected across the sense resistor 14. The outputs of the amplifiers 22 and 26 are summed in the summer circuit 24, the sum representing the BEMF voltage across the coil 11 which is produced on output line 20. It should be noted that the amplifiers 22 and 26 and summer circuit 24 form the velocity detector 18.

SUMMARY OF THE INVENTION

Therefore, in light of the above, it is an object of the invention to provide an improved method and circuit for determining the velocity of a data detector mechanism of a mass storage device, or the like, using a bemf voltage in the associated voice coil.

It is another object of the invention to provide an improved method and circuit of the type described for generating a BEMF voltage in a velocity feedback loop of a voice coil operated in a PWM operating mode.

These and other objects, features and advantages of the invention will be apparent to those skilled in the art from the following detailed description of the invention, when read in conjunction with the accompanying drawings and appended claims.

Thus, according to a broad aspect of the invention, a circuit is provided for measuring a back EMF voltage of a voice coil of a mass storage device in PWM operation. The circuit includes an amplifier connected across the coil to produce an output signal proportional to a voltage across the coil and a circuit connected to selectively connect the output signal of the amplifier to a circuit output when a driving current is not applied to the coil.

According to yet another broad aspect of the invention, a circuit is provided for determining a BEMF voltage of a voice coil of a mass storage device. The circuit includes an amplifier connected across the coil and a switch operable to selectively connect an output of the amplifier to a circuit output. A circuit is provided for operating the switch to connect the output of the amplifier to the circuit output at a time during which no drive current is being applied to the coil.

According to still another broad aspect of the invention, a method is provided for determining a BEMF voltage of a voice coil of a mass storage device. The method includes driving the coil with a drive current for a time proportional to an error signal in the loop, then discontinuing the drive current. Any current in the coil is then allowed to decay to approximately zero, and the voltage across the coil is measured while the current in the coil is approximately zero. Thus, the measured voltage corresponds to the BEMF voltage of the coil.

BRIEF DESCRIPTION OF THE DRAWINGS

The invention is illustrated in the accompanying drawings, in which.

In the various figures of the drawing, like reference numerals are used to denote like or similar parts.

DETAILED DESCRIPTION OF THE PREFERRED EMBODIMENTS

The proposed solution can be utilized if a discontinuous current can be applied to the coil, which is often the case for PWM systems. The method includes repeatedly driving the coil for a period proportional to the error signal in the loop, tri-stating the drivers in order to allow the decaying of the current, and opening a "sampling window" during which the BEMF voltage is measured (since the coil current is zero, the voltage across the coil corresponds exactly to the BEMF). It is noted that although typically in PWM operations, the PWM signal is used to decrease power dissipation with a chopped wave, in the context of the present invention, the PWM signal is used to allow the value of the current in the coil to decay, essentially to zero.

Figure 1:
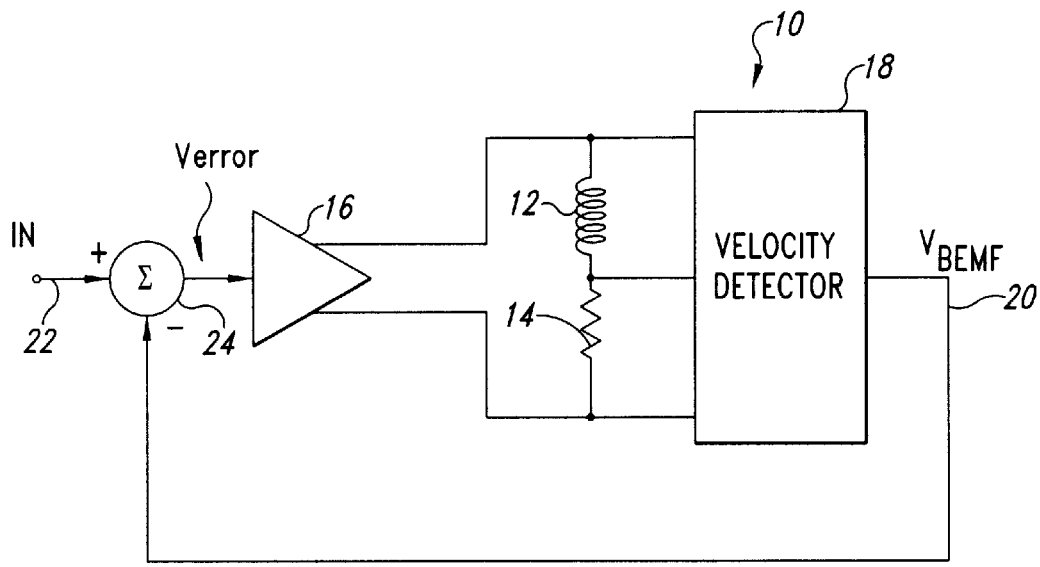
FIG. 1 is a block schematic diagram showing a velocity loop used in driving a voice coil of a mass storage device, or the like, in accordance with the prior art.
Figure 2:
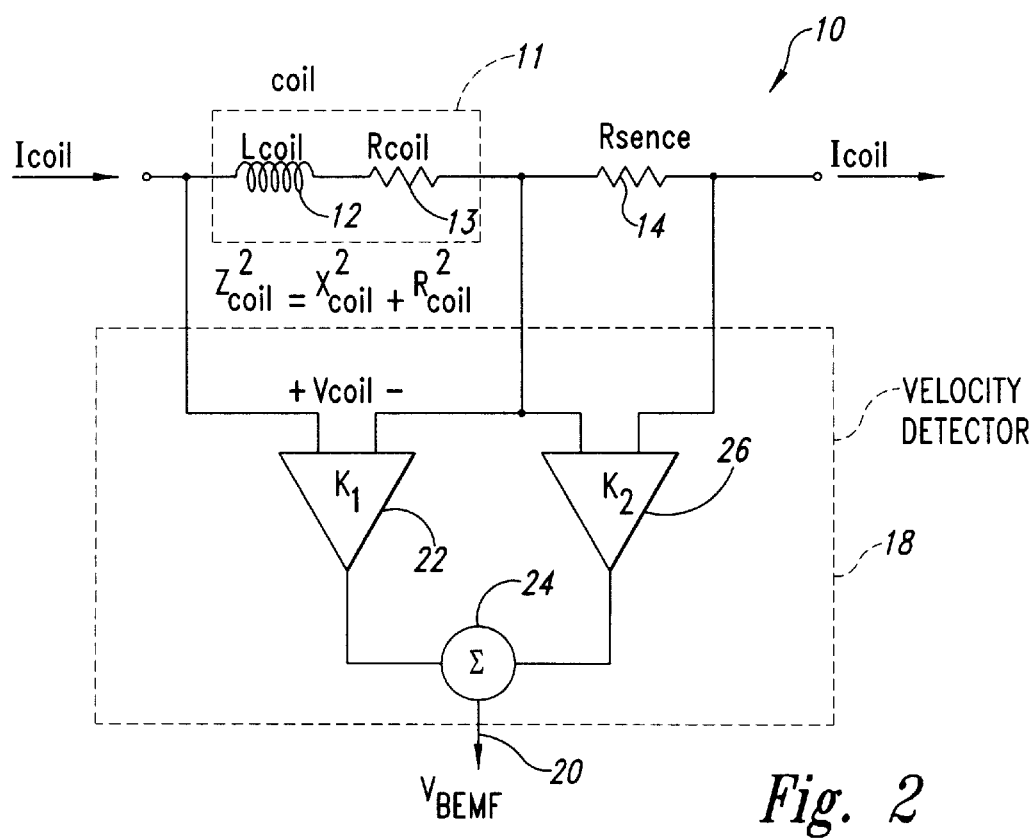
FIG. 2 is an electrical schematic diagram showing greater details of the velocity detector of FIG. 1, also in accordance with the prior art.
Figure 3:
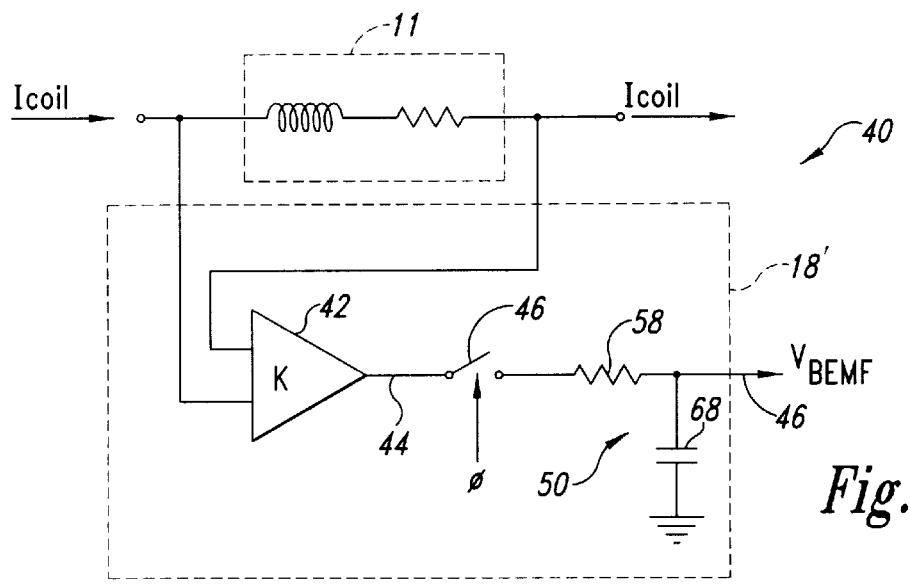
FIG. 3 is an electrical schematic diagram of a BEMF voltage detector that is generated as a part of a velocity detection circuit, used in conjunction with a voice coil of a mass storage device, or the like, in accordance with a preferred embodiment of the invention.

A circuit for accomplishing the BEMF voltage generation, according to this method is shown in FIG. 3. The circuit 40 shown in FIG. 3 provides for a velocity detector circuit 18' connected across the coil 11. The velocity detector circuit 18' includes an amplifier 42, having inputs connected across the coil 11. The output of the amplifier 42 on line 44 is connected to a switch 46. The switch 46 is operable to selectively connect the output of the amplifier 42 to the circuit output on line 48.

A filter circuit 50 is connected to the output line to filter the switching transients produced by the switch 46. The filter circuit 50 includes a resistor 58 in series between the switch 46 and output line 48 and a capacitor 68' connected between the output line 48 and a referenced potential or ground as shown.

The switch 46 is selectively opened or closed so that the BEMF voltage that is sensed on the coil 11 by the amplifier 42 is timed to a point at which the drive currents have decayed to zero, when the application of drive currents to the coil 11 have been discontinued. An appropriate time for doing this is during the PWM operation of the circuit.

Figure 4:
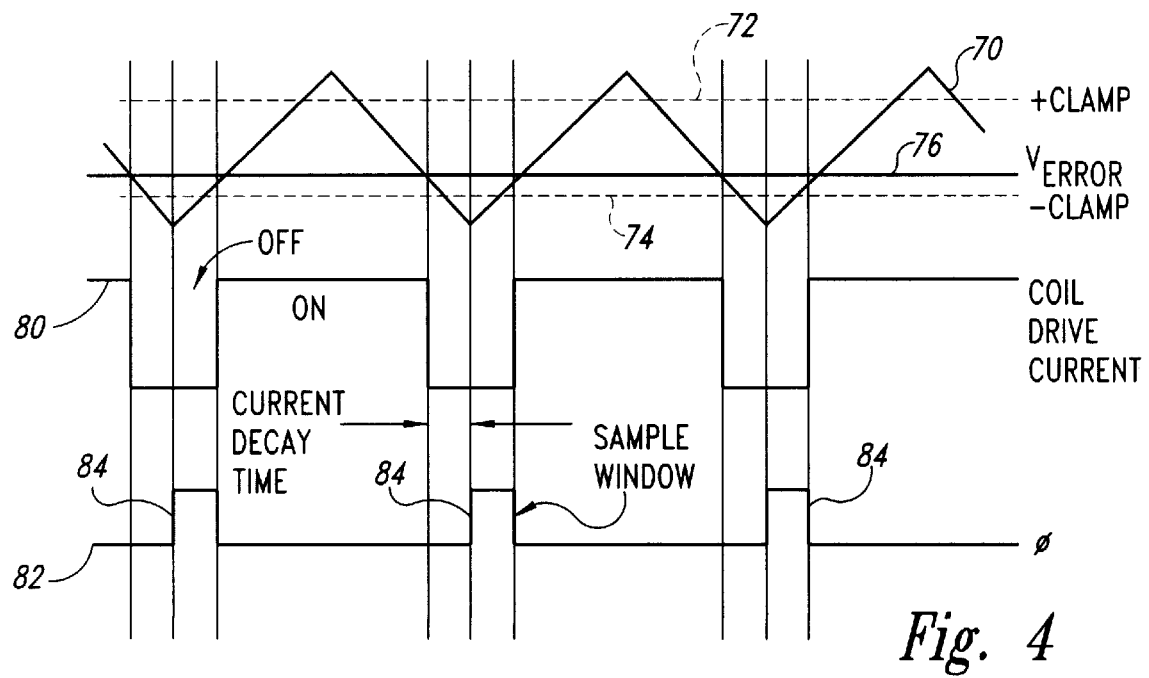
FIG. 4 shows a number of waveforms that are generated in the operation of the circuit of FIG. 3, in accordance with the preferred embodiment of the invention.

With additional reference now to FIG. 4, a PWM waveform 70 is provided. PWM waveform generating circuits or signal generating circuits and their operation are well known and are not described herein in detail. In general, the operation of a PWM circuit modulates the current that may be applied to the load, in this case, the voice coil of a mass storage device, or the like. Thus, particularly in PWM mode operation, the current is not continuously applied to the voice coil. Thus, the PWM operation provides discontinuities in the drive current during the time that the PWM voltage is below a particular error voltage.

It can be seen that even though the error voltage may change, higher or lower, the PWM voltage nevertheless has a symmetrical portion that falls beneath the level of the error voltage. In the center of the symmetrical PWM voltage below the voltage error level, a waveform transition occurs in which the PWM voltage changes from a negative to a positive slope. Conveniently, between the time that the PWM voltage crosses the error voltage level and the time of the slope transition of the PWM voltage, a time exists that can be used to measure a time period which is sufficient to allow the currents within the coil to decay, essentially to zero.

The second portion of the time that the symmetrical waveform is less than the voltage level can be used to define the sample window in which the voltage across the coil can be generated. The voltage during this period exactly equals the back BEMF voltage, since the currents have been allowed to decay to zero.

The PWM signal is modulated onto the drive current signal that is applied to the coils 11. As can be seen, the PWM signal 70 transitions between levels slightly above and slightly below plus clamp and minus clamp levels, 72 and 74, respectively. An error voltage level 76 exists between the plus and minus clamp voltages, and, during the positive transitions of the PWM waveform 70 above the error voltage level 76, drive currents are applied to the coil 11, as denoted by the waveform 80. During the times that the PWM waveform 70 is below the voltage error 76, as can be seen in waveform 80, the drive currents to the coil are turned off.

Conveniently, during the off time, the waveform 70 changes direction to a positive slope after a slope transition. This transition can be used to time a current decay time after the drive current has been discontinued, as shown. During the transition time from the time that the slope of the PWM signal 70 changes to a positive direction and the time that the PWM signal 70 crosses the voltage error threshold, a sample window is generated, as denoted by the waveform 82. The sample window, such as the sample window 84 shown, causes the switch 46 to close, thereby connecting the output of the amplifier 42 on line 44 to the circuit output line 48. Thus, the voltage that is generated during the sample time exactly represents the BEMF voltage that is generated in the coil 11.

Figure 5:
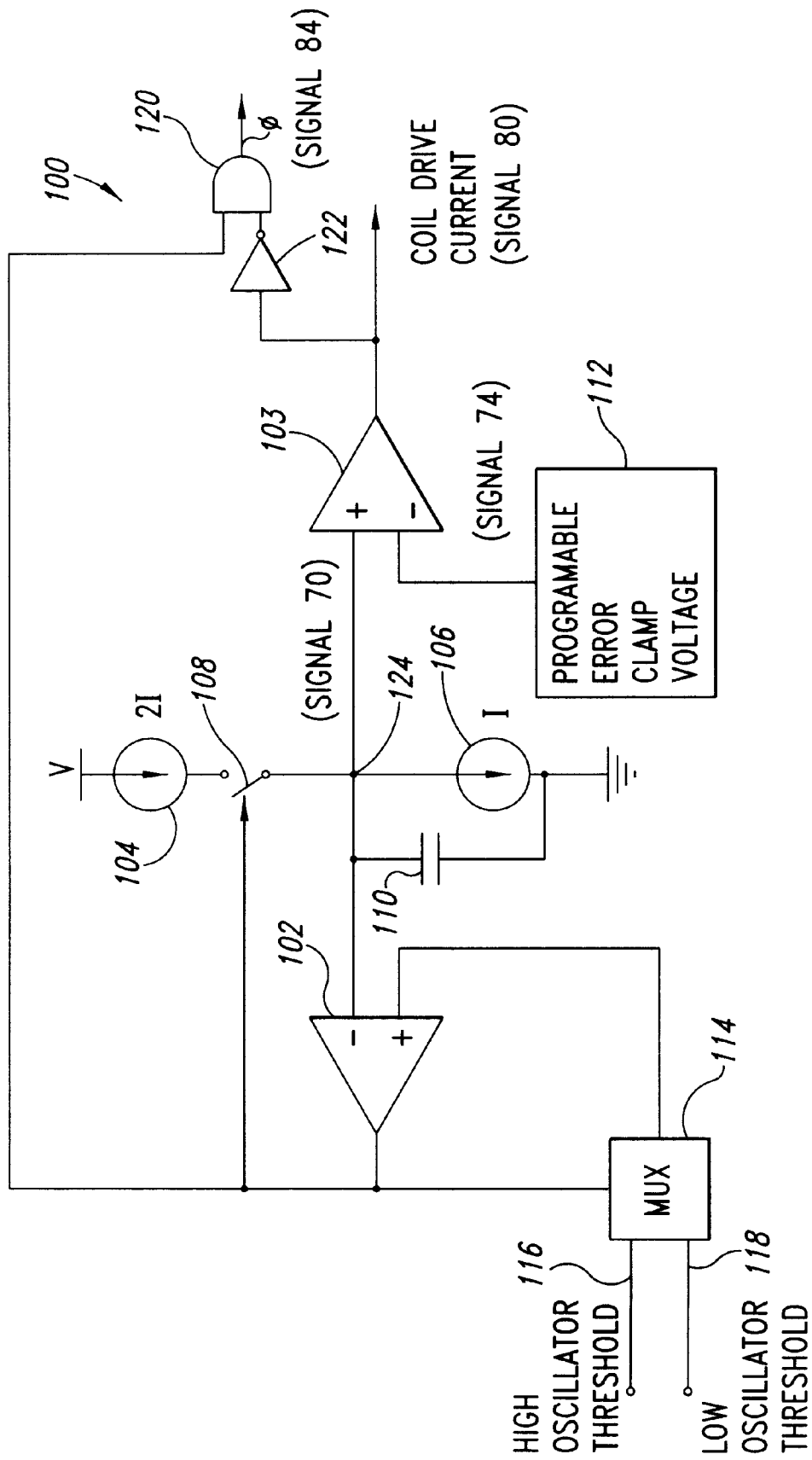
FIG. 5 is an electrical schematic diagram of a circuit for generating the signal fee used in the controlling being back EMF voltage in the circuit of FIG. 3.

As shown and FIG. 5, and the signal φ, which corresponds to the signal 84 in FIG. 4, may be generated with a circuit and 100, which has back-to-back comparators 102 and 103. The input inverting input to the comparator 102, and the corresponding non-inverting input to the comparator 103, receive a triangular waveform corresponding to the triangular waveform 70 shown in FIG. 4. The triangular waveform is generated by a circuit which includes a current source 104, which supplies current of value 2I, and a current source 106 that sinks a current value I. A switch 108, which is operated by the comparator 102 and multiplexor circuit 114 described below, switchably connects and disconnects the current source 104 to and from the current source 106. The resulting voltage that is developed on a capacitor 110, which is connected from the comparator inputs to ground.

The non-inverting input of the comparator or 102 receives the output of the multiplexor circuit 114, the inputs of which represent a high oscillator threshold 116 and low oscillator threshold 118. The state of the multiplexor 114 is controlled by the output of the comparator 102, so that the output of the multiplexor 114 is alternately switched between the high and low oscillator thresholds 116 and 118. The output of the comparator 102 is also connected to control the state of the switch 108, which connects and disconnects the current source 104 to and from the current source 106. Finally, the output of the comparator 102 is connected to an input of an AND gate 120.

On the other hand, the non-inverting input of the comparator 103 receives a voltage signal from a programmable error or clamp voltage circuit 112. The output from the programmable error clamp voltage circuit 112 corresponds to the $V_{error}$ signal 76 in FIG. 4. The output of the comparator or 103 provides the drive to the voice coil motor, and corresponds to the signal 80 shown in FIG. 4. The output from the comparator or 103 also is connected to an inverter 122, the output of which is connected to a second input of the AND gate 120.

In operation, it can be seen that as the switch 108 is turned on and off, the voltage on node 124 that is induced upon the capacitor 110 provides a triangular wave, as the current is alternately imposed on to the node 104, from which current I is always sunk. As a result, when the output from the multiplexor 114 exceeds the voltage on capacitor 110, the input to the multiplexor 114 is alternately switched between the high and low oscillator thresholds. Concurrently, the output from the comparator 102 opens and closes the switch 108, which, in turn, contributes to the generation of the triangle wave described above.

Additionally, the error voltage provided by the circuit 112 (signal 74 in FIG. 4) is inverted and controls the passage of the control signal from the comparator 102 through the AND gate 120. As mentioned, the output from the AND gate 120 provides the signal φ to control the state of the switch 46 in FIG. 3.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

What is claimed is:

1. A circuit for measuring a back EMF voltage of a coil in PWM operation, comprising:
   an amplifier connected across the coil to produce an output signal proportional to a voltage across the coil; and
   a circuit connected to selectively connect the output signal of the amplifier to a circuit output when a driving current is not applied to said coil.

2. The circuit of claim 1 wherein said circuit connected to selectively connect the output signal of the amplifier to a circuit output operates to connect the output signal of the amplifier to a circuit output during a sample window.

3. The circuit of claim 2 wherein said sample window exists between a time during which a PWM signal changes from negative to positive and a time when the PWG waveform crosses a voltage error value.

4. The circuit of claim 3 wherein said sample window exists after any drive currents in said coil have decayed to approximately zero.

5. The circuit of claim 1 wherein said circuit connected to selectively connect the output signal of the amplifier to a circuit output comprises a switch in series between the output signal of the amplifier and the circuit output, and circuitry to close said switch during a sample window.

6. The circuit of claim 1 further comprising a filter connected to filter the circuit output.

7. The circuit of claim 6 wherein said filter comprises a resistor in series with the circuit output and a capacitor connected between the circuit output and a reference voltage.

8. A circuit for determining a BEMF voltage of a coil, comprising:
   an amplifier connected across said coil;
   a switch operable to selectively connect an output of the amplifier to a circuit output;
   a circuit for operating said switch to connect the output of the amplifier to the circuit output at a time during which no drive current is being applied to said coil.

9. The circuit of claim 8 wherein said time during which no drive current is being applied to said coil occurs between a time during which a PWM signal changes from negative to positive and a time when the PWM waveform crosses a voltage error value.

10. The circuit of claim 9 wherein said time during which no drive current is being applied to said coil occurs after any drive currents in said coil have decayed to approximately zero.

11. The circuit of claim 8 further comprising a filter connected to filter the circuit output.

12. The circuit of claim 11 wherein said filter comprises a resistor in series with the circuit output and a capacitor connected between the circuit output and a reference voltage.

13. A method for determining a BEMF voltage of a coil, comprising:
   driving the coil with a drive current for a time proportional to an error signal in the loop;
   discontinuing the drive current;
   allowing any current in the coil to decay to approximately zero; and measuring the voltage across the coil while the current in the coil is approximately zero, whereby the measured voltage corresponds to the BEMF voltage of the coil.

14. The method of claim 13 wherein said driving the coil comprises providing a drive current from coil drivers and wherein discontinuing the drive current comprises tri-stating a coil driver.

15. The method of claim 13 wherein said coil is operated in a PWM driving mode, and wherein said discontinuing the drive current and allowing any current in the coil to decay to approximately zero occur in timed relationship to a PWM signal.

* * * * *